United States Patent [19]

Wheaton

[11] Patent Number: 5,291,986
[45] Date of Patent: Mar. 8, 1994

[54] PRINTER EXIT RETRIEVER AND CONVEYOR

[75] Inventor: Robert A. Wheaton, Windsor, Conn.

[73] Assignee: Aetna Life Insurance Company, Hartford, Conn.

[21] Appl. No.: 977,137

[22] Filed: Nov. 16, 1992

[51] Int. Cl.$^5$ .................................... B65G 47/34
[52] U.S. Cl. ................................ 198/468.6; 414/790
[58] Field of Search ............... 198/468.1, 468.6, 774.3; 414/790, 790.1

[56] References Cited

U.S. PATENT DOCUMENTS

| | | | |
|---|---|---|---|
| 2,061,358 | 11/1936 | Hunter et al. | 198/468.6 X |
| 2,896,946 | 7/1959 | Barratt et al. | |
| 3,643,939 | 2/1972 | Nussbaum et al. | |
| 4,010,843 | 3/1977 | Lucas | 198/468.6 |
| 4,055,258 | 9/1977 | Schneider | |
| 4,265,360 | 5/1981 | Khodos | |
| 4,286,422 | 9/1981 | Howe, Jr. | |
| 4,314,403 | 2/1982 | Sanekata | |
| 4,395,177 | 7/1983 | Seragnoli | |
| 4,610,595 | 9/1986 | Hockersmith et al. | 198/468.6 X |
| 4,620,827 | 10/1986 | Sameshima et al. | |
| 4,865,180 | 9/1989 | Brems et al. | 198/468.6 |
| 4,919,589 | 4/1990 | Krappitz et al. | |
| 4,928,811 | 5/1990 | Waineo | |
| 4,936,438 | 6/1990 | Waineo | 198/468.6 |
| 5,086,907 | 2/1992 | Nitschke et al. | 198/468.6 |

*Primary Examiner*—James R. Bidwell
*Attorney, Agent, or Firm*—Chilton, Alix & Van Kirk

[57] ABSTRACT

A conveyor is mounted on the upper surface of an elongated frame. At one end of the conveyor is provided a retriever assembly for retrieving a stack of material as from the exit bin or tray of a printer or copier. The retriever has elongated fingers sandwiched between runs of the conveyor. These fingers are moved horizontally and vertically so as to move out from the conveyor, pick up a stack of material, bring it back and deposit it on the conveyor. Independent motor operated mechanism effects this vertical and horizontal movement of the fingers. The conveyor is of sufficient length to store several stacks of material and operation of the conveyor and the retriever is controlled to retrieve and store the stacked material.

5 Claims, 4 Drawing Sheets

PRINTER EXIT RETRIEVER AND CONVEYOR

BACKGROUND OF THE INVENTION

The apparatus of the invention is for use with modern high speed, high production printing or copying machines such as are used today in businesses, schools and the like. In the operation of these machines, the printed material, be it single sheets or multiple sheets such as pamphlets or brochures bound together by stapling, quickly accumulate in a stack at the exit bin of the machine. These bins fill to a predetermined stack height, after which the machine automatically terminates further printing until this stack is removed. This occurs in a rather short time so that the diligent effort of an attendant is required in order to get the maximum use and efficiency from the machine. This of course is even a more significant problem when these machines are ganged as in a large printing facility.

The apparatus of the present invention greatly diminishes the attention required by the attendant, in that with the invention, the stack of printed material is automatically removed from the exit bin of the machine and deposited on a conveyor where several stacks of the material may be stored before it is necessary that they be removed by the attendant.

While various apparatus are known in the prior art for mechanically conveying material, be it stacked or otherwise, and for retrieving material from one location and depositing the same in another, none of these apparatus is suitable for the purposes of the present invention. For example, U.S. Pat. Nos. 4,286,422 and 4,928,811 both disclose walking beam conveyor designs for moving material along a horizontal path by means of a group of beams or transfer elements that first elevate the material and then move it forward a predetermined distance after which they are lowered to deposit the material on elements that will retain it in this location while the beams or transfer elements are moved back to their original position where they will again engage the material, elevate the same and move it forward another predetermined distance. These devices are not suitable for the present invention. U.S. Pat. Nos. 2,896,946, 4,314,403 and 4,919,589 all disclose various designs of transfer apparatus for transferring stacked material from one location to another as from one conveyor to another. In the U.S. Pat. Nos. 2,896,946 and 4,919,589, the transfer devices are so organized that the stack material is rotated 90 degrees so that it is transformed from a horizontal to an on edge position with support arrangements being required to keep it in the on edge position. In the U.S. Pat. No. 4,314,403, the transfer device is effective to transfer plates from one conveyor to another where they are stacked, but the rotary transfer apparatus is such that the plates themselves must be rigid since they are lifted by apparatus that engages each edge of the plate. These apparatuses are accordingly likewise unsuitable for the present invention.

SUMMARY OF THE INVENTION

It is an object of the present invention to provide an apparatus for automatically removing stacked material from the exit bin of a high speed printer or copying machine and to store a number of these stacks to thereby increase the time interval of the attendant in servicing the machine.

It is a further object of the invention to provide such an apparatus in order to increase the output obtainable with the machine and accordingly the efficiency of the operation and in the case of ganged machines to decrease the attendant personnel required.

These and other objects and advantages are accomplished in accordance with the present invention, wherein there is provided a frame adapted to receive at one end the exit bin or tray of the printing press and extend at generally right angles to the printing machine. On the upper surface of the frame, there is provided a conveyor, the upper surface of which is at generally the same height as the printer exit tray. At the end of the conveyor adjacent the printing machine, there is mounted on the frame a retrieving assembly for receiving a stack of documents from the exit bin of the printing machine and depositing the stack on the adjacent end of the conveyor. This operation is effected through manipulation of a plurality of cantilevered, generally horizontal, parallel fingers. During the printing operation these fingers occupy a first or neutral position where they are below the surface of the conveyor and generally within the confines of the conveyor, with the fingers being positioned in between the longitudinal runs of the conveyor. This neutral position is maintained while the printing operation is being carried out and the stack is being produced. After the desired stack of printed material has been produced the fingers are moved horizontally to an extended position where they are below the stack of materials. They are then elevated to lift the stack of material from the exit bin surface. In this raised position the fingers with the material thereon are retracted so that the material is positioned over the conveyor and thereafter the fingers are lowered to their original neutral position, and the material supported entirely on the conveyor. To thus manipulate the fingers, there is provided a first motor operated mechanism for producing the horizontal movement and a second motor operated mechanism for producing the vertical movement. The first motor operator includes a ball screw mechanism while the second operator includes a hinged parallelogram assembly, cam operated to produce the desired vertical movement. The operation of the retrieving assembly and the stack conveyor are controlled so as to automatically move stacks of material from the exit bin of the printer and temporarily store a number of these stacks on the conveyor for subsequent removal by operating personnel.

The equipment of the present invention is thus independent of the copying or printing machine from which it retrieves material. It requires no electrical or mechanical interface with the machine; preferably, it uses only an optical interface for starting and stopping each cycle. The equipment can accept a variety of product sizes without set up changes, e.g., a range of 8 inch $\times$ 1 inch to 8.5 inch $\times$ 14 inch, or 6 inch round weighing 15 lbs. or less. With a minor set up, the equipment can accomodate produce size as small as 4 inch $\times$ 1 inch. Through a simple control algorithm change, the equipment can be configured to deliver product from a first machine, to a second machine for further processing, rather than merely stacking the products from the first machine. Furthermore, the equipment can be used in systems other than those involving stacked documents, without reconfiguration.

BRIEF DESCRIPTION OF THE DRAWINGS

The preferred embodiment of the invention will be described with reference to the accompanying drawings in which.

DESCRIPTION OF THE PREFERRED EMBODIMENT

Figure 1:
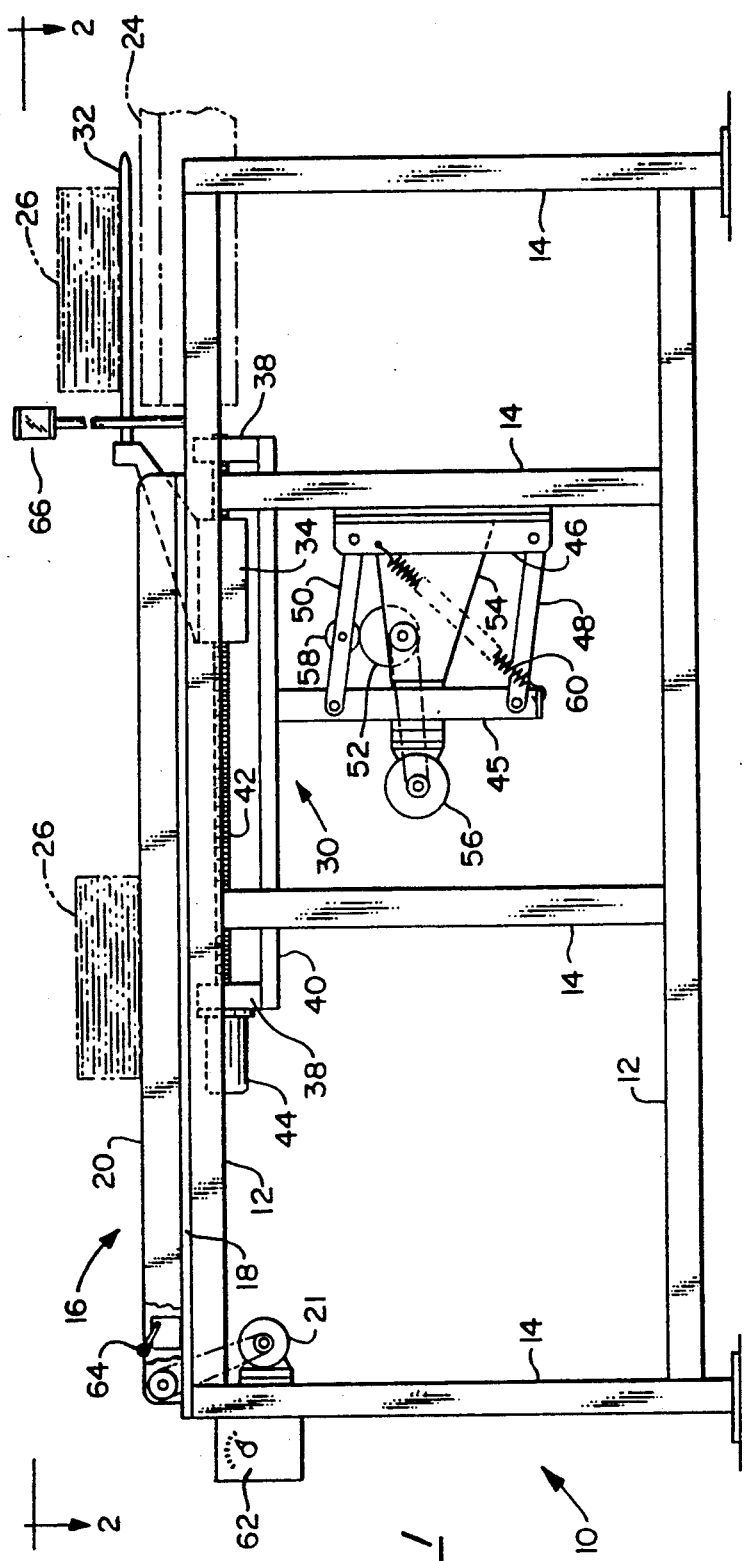
FIG. 1 is a side view of the retriever, conveyor apparatus of the invention with the retriever support fingers being in their extended and raised position where they have lifted a stack of material from the exit bin of the printer. In this view, stacks of material and a fragmentary portion of the exit bin of the printer are shown in phantom.

Referring now to the drawings, wherein like reference characters are used throughout the designate like elements, there is provided a frame 10 formed of horizontal structural members 12 and vertical members 14 secured together to form an elongated table-like structure. On top of this structure is mounted a stack conveyor 16 which includes the base plate 18 having provided on its upper surface laterally spaced longitudinally extending members 20. Each of these members includes an endless belt stretched over pulleys at each end of an elongated support. The upper runs of the belts, there being four such belts as depicted in FIG. 2, are coplanar and horizontal in order to receive and support a stack of material to move the same from right to left as viewed in FIGS. 1 and 2 with the belts being driven by an electric motor 21 through a suitable belt and pulley system.

Figure 2:
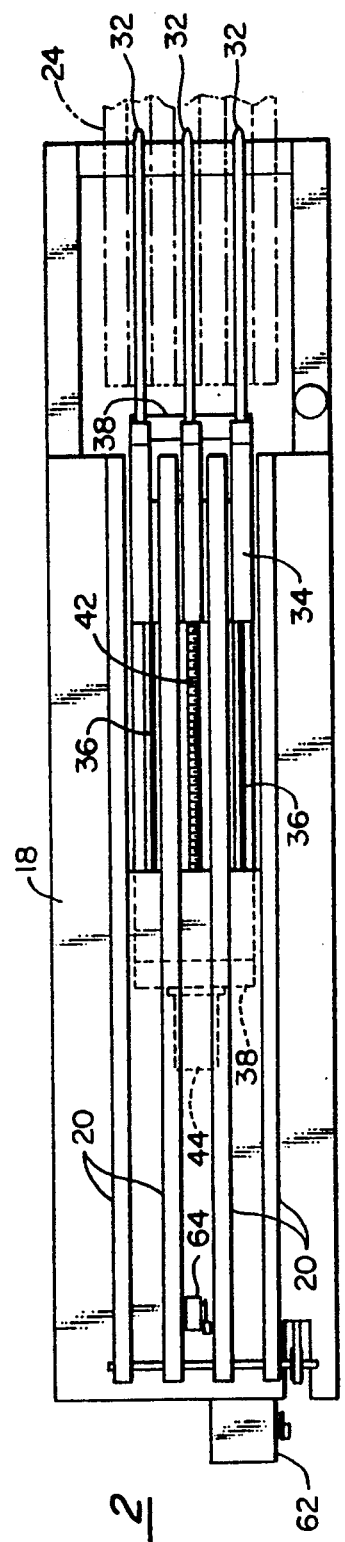
FIG. 2 is a top view taken generally from line 2—2 of FIG. 1.

The stack conveyor 16 does not extend to the extreme right end of the frame 10, but rather terminates short of this end of the frame in order to provide at the upper end of this frame region a well or opening for receiving the exit bin or tray 24 of a high speed printing or copying machine with this tray 24 being shown in phantom in FIGS. 1 and 2.

In order to remove a stack of material 26 from the exit bin and place it on the stack conveyor at the right end of the conveyor as viewed in FIGS. 1 and 2, there is provided a "picker" or retriever assembly designated generally 30. This retriever assembly includes the spaced parallel fingers 32 cantilevered from the head 34. This head is formed with upwardly extending portions, perhaps shown best in FIG. 7, which extend between the elongated members 20 of the stack conveyor so that in a neutral position, as explained hereinafter, fingers 32 are located within the confines of the conveyor below the upper surface thereof and intermediate the spaced conveyor belts.

Figure 7:
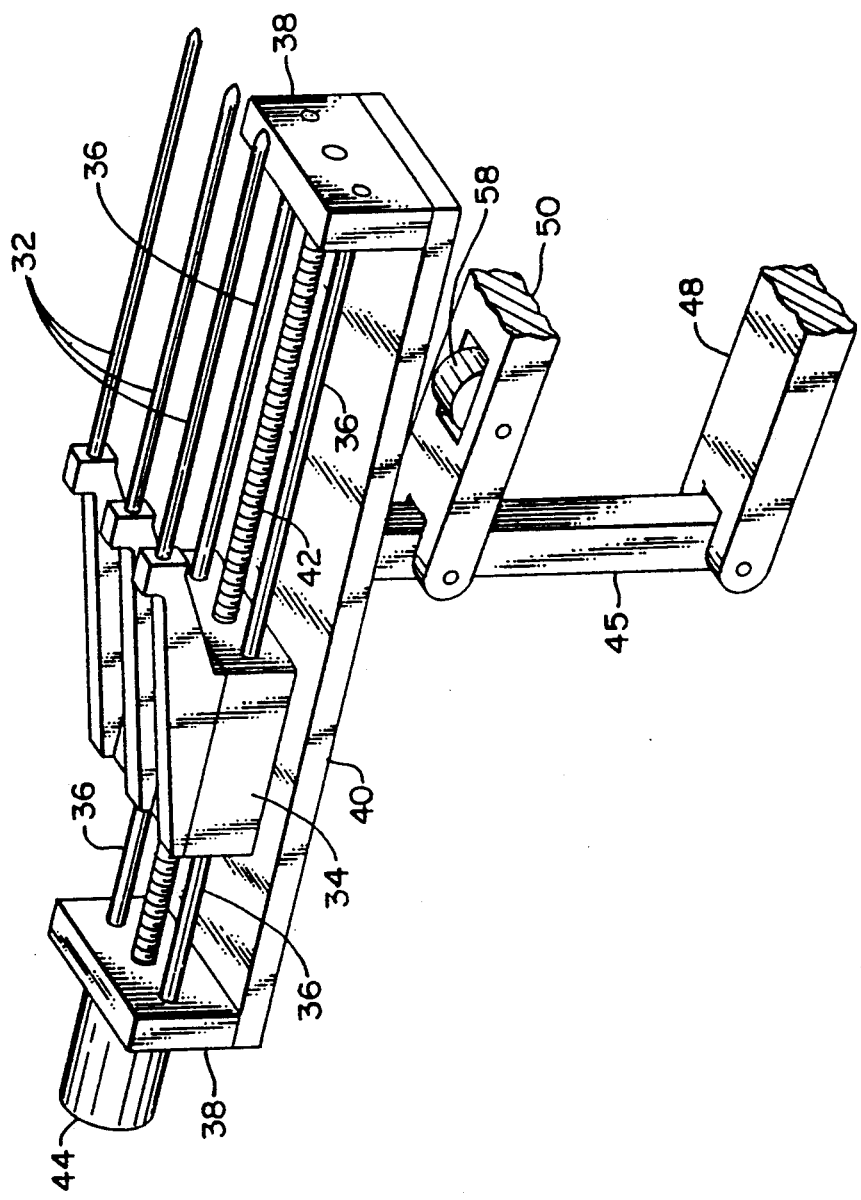
FIG. 7 is in the nature of a perspective view of a portion of the retriever mechanism.

The head 34 is mounted so that it can be moved horizontally with respect to frame 10 and for this purpose laterally spaced horizontally disposed rods 36 extend between and are fastened to the end blocks 38 with these blocks in turn being secured to the support plate 40 as best shown in FIG. 7. The head 34 is slidable along the rods 36 having suitable closely dimensioned bores through which the rods extend.

Horizontal motion of head 34 and accordingly fingers 36 is produced by means of a ball screw drive, with this drive including the spindle or threaded member 42 suitably journaled to the end blocks 38 and engaged with a ball screw mechanism in the head 34. The spindle 32 is driven by the reversible electric motor 44.

Vertical movement of the fingers 32 is achieved by means of a parallelogram actuating assembly which is connected with and supports plate 40 so as to move the plate and its associated equipment including fingers 32 between a lower and an elevated position. This parallelogram assembly includes the vertical members 45 and 46 and the generally horizontal members 48 and 50. These members are pivotally interconnected and member 46 is rigidly secured to the frame 10. The upper end of member 45 is secured as by welding to plate 40, thereby providing the entire support for this plate within the frame 10. The vertical position of plate 45 and accordingly fingers 32 is determined by an eccentric cam actuator that includes an eccentric 52 journaled to the structural support 54 and driven by electric motor 56. A cam follower 58 is journaled to the upper arm or horizontal member 50 of the parallelogram actuating mechanism. The disposition of eccentric 52 and follower 58 is such that in one extreme position of the eccentric, as shown in FIGS. 1, 5 and 6, the fingers 32 are located above the upper surface of stack conveyor 16 or in other words above the upper run of the belts of this conveyor, while in another extreme position, shown in FIGS. 3 and 4, the fingers 32 are located below this upper surface.

In order to ease the force exerted against the cam follower and the eccentric and to decrease the work that is required of the electric motor 56 a portion of the weight that is supported by the vertical member 45 is counterbalanced by means of the spring 60 that is stretched between member 45 and stationary member 46 as shown.

Figure 3:
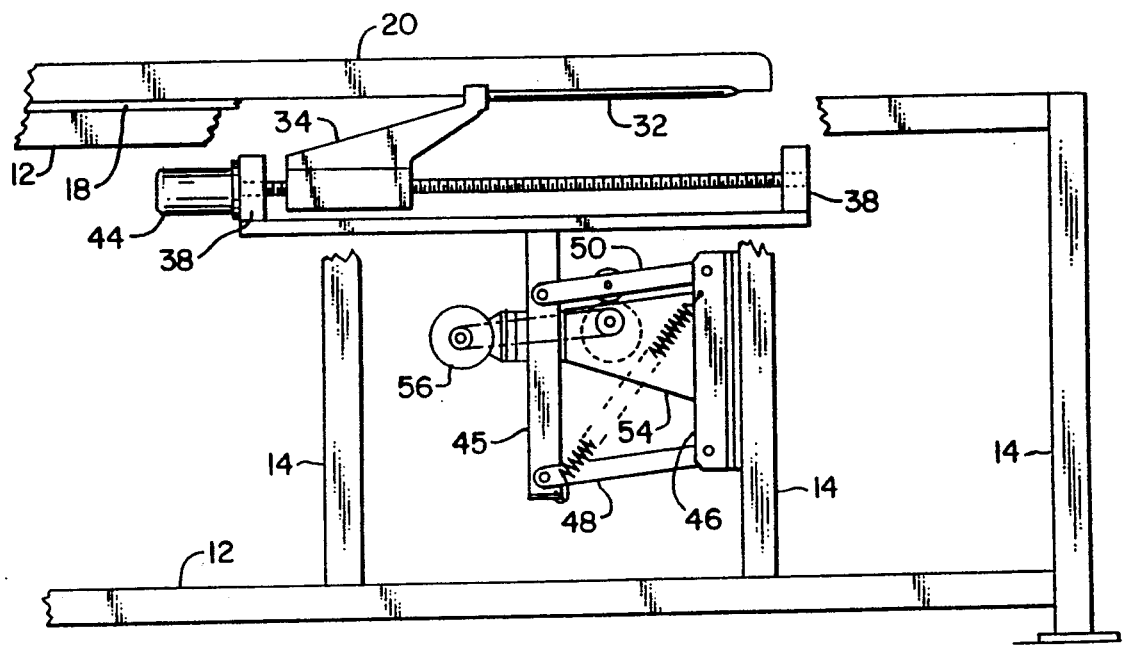
FIGS. 3, 4, 5 and 6 are fragmentary views, generally in the side elevation, showing the retrieving mechanism in its neutral or retracted-lowered position, its extended-lowered position, its elevated-extended position, and its retracted-elevated position, respectively.
Figure 5:
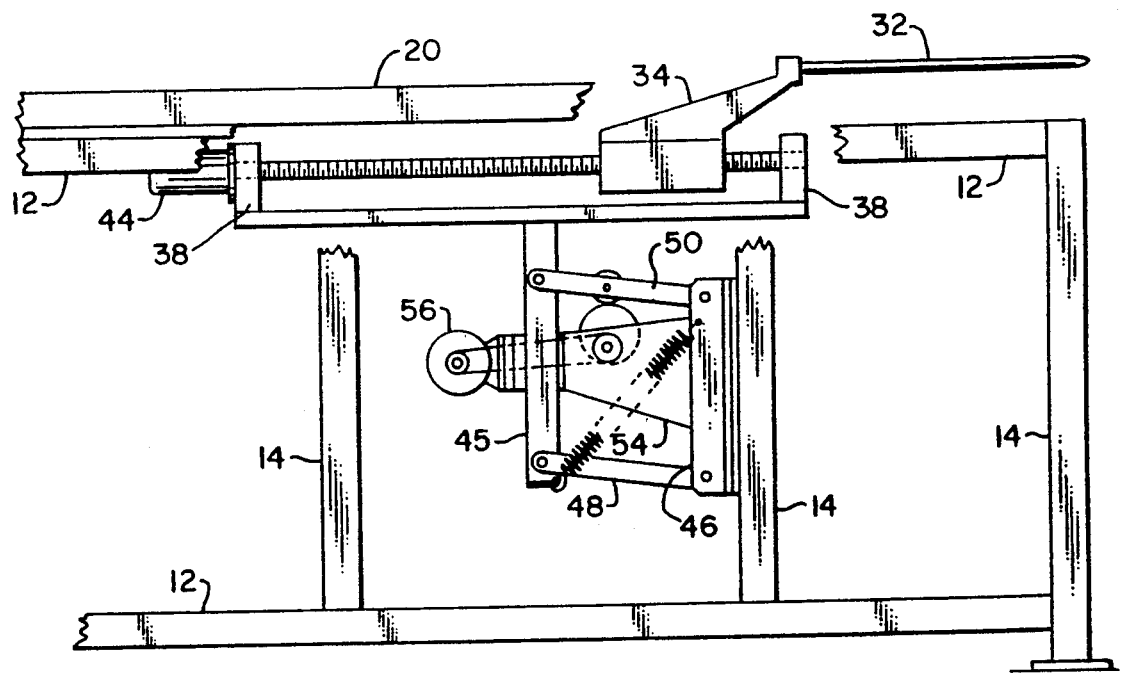
Figure 4:
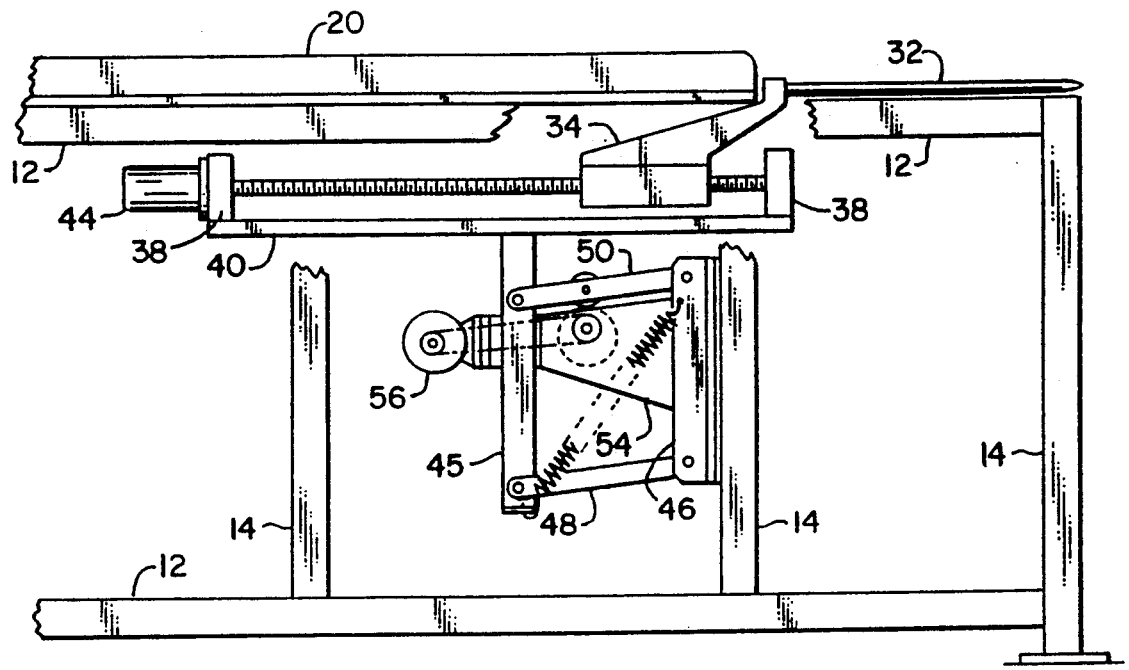
Figure 6:
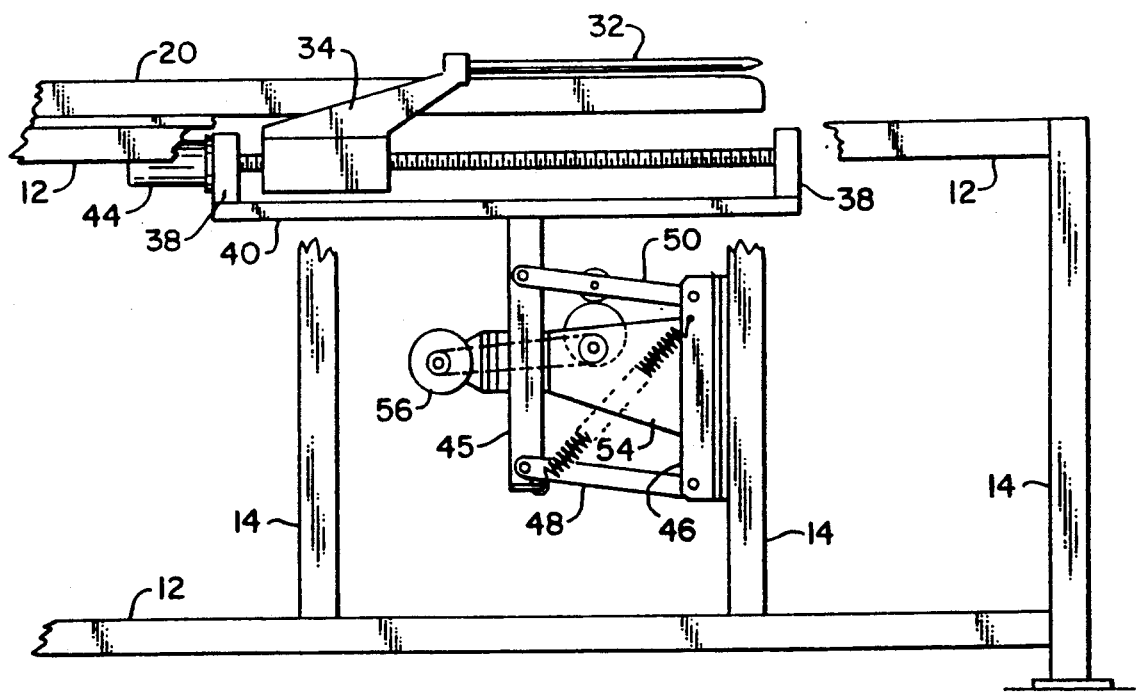

The orientation of the support plate 40 in the frame 10 is such that the horizontal movement of the head 34 along the rods 36 is to and from a retracted position, shown in FIGS. 3 and 6, and an extended position where the fingers extend out from the end of the conveyor 16 with the extended position being shown in FIGS. 1, 4 and 5.

In operation, the apparatus of the invention is designed to retrieve stacks of material from the exit bin or tray of a printer, deposit the same on the conveyor 16 where a plurality of them (for example three in the illustrative organization) can be stored until removed by an attendant, thereby substantially increasing the time interval that the attendant has in servicing the printer and accordingly increasing the operating efficiency of the printer. This operation is achieved in the following manner. When the stack of material in the exit bin of the printer reaches a predetermined height as determined by any suitable mechanism such as electric eye or limit switches, which are part of the printing machine and do not form a part of the present invention, the electric motor 38 is energized to move the fingers 32 from what may be said to be their neutral or normal position depicted in FIG. 3, to their lower extended position shown in FIG. 4, and where they will be positioned below the stack of material in the exit bin of the printer. (The floor of the exit bin of the printer will be formed to permit this positioning of the fingers 32.) Upon reaching this extended position of FIG. 4, motor 56 will automatically be energized and the fingers will be moved to their raised position depicted in FIG. 5, thereby lifting the stack of material from the floor of the printer exit bin. Upon reaching this elevated position of FIG. 5, electric motor 38 will be energized to return the fingers to the retracted position shown in FIG. 6 and motor 56 will again be energized to lower the fingers to their position shown in FIG. 3 and accordingly deposit the stack of material on the upper run of the belts of the conveyor 16. Upon movement of the fingers 32 horizontally from their lower retracted position to their lower extended position of FIGS. 3 and 4 respectively, the electric motor 21 will be energized to move the upper run of the belts of the conveyor 16 to the left as viewed in FIGS. 1 and 2 a distance slightly greater than the length of a stack of material that is to be handled by the apparatus of the invention, therefore the region of the conveyor associated with the fingers 13 is then free to receive the next stack of material 26.

After the retrieving mechanism has gone through its cycle to retrieve a stack of material from the exit bin on the printer and deposit it on the end of the conveyor, this mechanism remains in its neutral position as depicted in FIG. 3, until another stack of material is built up in the exit bin of the printing machine.

The control of the electric motors 21, 38 and 56 may be achieved through various control devices such as electric eyes and/or limit switches. However, in the preferred embodiment, electronic control is provided to achieve these desired results with this control being depicted schematically and identified as 62 in FIGS. 1 and 2.

As previously mentioned, in the embodiment of the invention illustrated the conveyor 16 is designed to store three stacks of material. When this capacity has been reached, switch 64 is activated, which in turn causes the indicator light 66 to be illuminated in order to draw the attention of the attendant to the fact that the storage capacity of the conveyor has been reached.

I claim:

1. Apparatus for retrieving and temporarily storing stacked material comprising:

an elongated frame;

a stack conveyor mounted on top of said frame longitudinally thereof and including laterally spaced, parallel, coplanar support members for engaging the bottom of a stack of material and conveying the same longitudinally of said frame;

a retrieving assembly mounted on said frame at one end of said stack conveyor, said retrieving assembly including, a plurality of coplanar, parallel elongated support fingers intermediate and generally parallel with said support members, a head member from which said fingers project in a direction outwardly of said one end of said conveyor, said head member extending downwardly from said fingers, mounting means positioned below said fingers and conveyor and upon which said head member is mounted for movement in a direction parallel to said fingers, motor means operative to effect said movement of said of said head member to and from a retracted position where said fingers are generally within the confines of the conveyor and an extended position where said fingers extend beyond said end of the conveyor, means supporting said fingers, head member, mounting means and motor means for limited vertical movement as a unit to and from a lower position where said fingers are below the upper surface of the conveyor and an upper position where said fingers project above the upper surface of said conveyor, the supporting means including, a hinged parallelogram actuating assembly having vertically spaced generally horizontal arms and laterally spaced vertical arms pivotally interconnected, one end of said actuating assembly being fixed to said frame while the other end is free through pivotal action to move vertically, and a motor operated eccentric effective to pivotally operate said actuating assembly to move said fingers to and from said upper and lower positions; and means effective to control the operation of said motor means and said motor operated eccentric.

2. The apparatus of claim 1 wherein the mounting means upon which said head member is mounted includes a pair of spaced parallel rods parallel with said fingers and secured between end plates, said head member being received on said rods for movement along the rods in said direction parallel to the fingers.

3. The apparatus of 2 wherein the said motor means comprises a ball screw actuator.

4. The apparatus of claim 1 wherein said motor operator eccentric includes a motor driven eccentric cam mounted for rotation about a fixed axis and a follower journaled to the upper arm of the hinged parallelogram support structure.

5. The apparatus of claim 1 wherein the stack conveyor includes endless belts on said support members oriented to receive the stacked material on an upper run thereof, a motor drive for said belts to move said material from one end toward the other end of the conveyor and means to control said motor drive.

* * * * *